United States Patent [19]

Ogasawara et al.

[11] 3,888,830
[45] June 10, 1975

[54] CURABLE COMPOSITIONS

[75] Inventors: Takahisa Ogasawara; Yoshimichi Senzaki; Hiroyuki Kato; Hidemaro Tatemichi, all of Nagoya, Japan

[73] Assignee: Toagosei Chemical Industrial Co., Ltd., Tokyo, Japan

[22] Filed: Nov. 5, 1973

[21] Appl. No.: 412,878

[30] Foreign Application Priority Data
Nov. 10, 1972  Japan .............................. 47-112624

[52] U.S. Cl. .............. 260/76; 260/486; 204/159.19
[51] Int. Cl. ....................... C08g 17/10; C07c 69/54
[58] Field of Search ................. 260/75 R, 76, 485 G

[56] References Cited
UNITED STATES PATENTS

| | | | |
|---|---|---|---|
| 3,455,801 | 7/1969 | D'Alelio | 260/76 |
| 3,567,494 | 3/1971 | Fitko | 260/76 |

*Primary Examiner*—Joseph L. Schofer
*Assistant Examiner*—Maria S. Tungol
*Attorney, Agent, or Firm*—Frank J. Jordan

[57] ABSTRACT

Curable compositions consisting essentially of a radical polymerization initiator and oligoacrylates containing a few acryloyl groups and at least one cyclohexene nucleus in the molecule and being curable by other means than the action of ionizing radiation even in the presence of a molecular oxygen-containing gas.

5 Claims, No Drawings

CURABLE COMPOSITIONS

This invention relates to a curable composition. More particularly it relates to a composition which comprises an oligoacrylate containing at least one cyclohexene nucleus in the molecule and a radical polymerization initiator and is curable by a means other than the action of ionizing radiation in the presence or absence of a molecular oxygen-containing gas.

In this specification the expressions "(meth)acrylate", "(meth)acrylic acid", "(meth)acryloyl group" and "oligo(meth)acrylate" are intended to mean acrylate and methacrylate, acrylic and methacrylic acids, acryloyl and methacryloyl groups, and oligoacrylate and oligomethacrylate, respectively, unless otherwise specified.

It has heretofore been known that various vinylic monomers are respectively polymerized by the action of ionizing radiation or in the presence of a radical polymerization initiator, in the atmosphere of an inert gas or under conditions wherein air is excluded.

On the other hand, the methods for the radical polymerization of vinylic monomer in the presence of a molecular oxygen-containing gas such as air, are still not essentially satisfactory ones. This is substantiated by, for example, "Kagaku to Kogyo (Science and Industry)"42, 462 by Minoru Imoto (1968) and "Makromolekulare Chemie" 18/19, 437 by G. V. Schulz und G. Henrici (1956), which publications provide data on, for example, the polymerization of methyl methacrylate at 50°C as indicated in the following table in which M, R., RM., RO$_2$. and O$_2$ represent a monomer, catalyst radical, monomer radical, oxygen radical and molecular oxygen, respectively.

Table

| Reaction | Symbol for velocity constant | Ratio between velocity constants |
|---|---|---|
| R· + M → RM· | $K_1$ ($\approx K_2$) | |
| RM· + M → RM· | $K_2$ | $K_2/K_4 = 3 \times 10^{-5}$ |
| R· + O$_2$ → RO$_2$· | $K_3$ ($\approx K_4$) | |
| RM· + O$_2$ → RO$_2$· | $K_4$ | |
| RC$_2$· + M → RM· | $K_5$ | $K_5/K_6^{1/2} = 1.39 \times 10^{-3}$ |
| RO$_2$· + RO$_2$ → non-active material | $K_6$ | |

From the table it is seen that $K_4$ for the oxygen radical-producing reaction caused by the reaction of monomer radicals with oxygen is $10^5$ times as large as $K_2$ for the growth reaction and, furthermore, the oxygen radicals so produced are almost stabilized ($K_5/K_6^{1/2} = 10^{-3}$) whereby it is considered that the growth reaction hardly takes place.

Since the (meth)acryloyl radicals or groups are thus capable of anaerobic cure, oligo(meth)acrylates having these groups as polymerizable functional ones at the terminals of the molecule are accordingly capable of anaerobic cure. Thus, if they are attempted to be subjected to radical polymerization in the presence of molecular oxygen such as air, there will usually be obtained such cured ones as are not cured at all on the surface portion contacted with air during the polymerization, due to the polymerization-inhibiting action of the oxygen in the air, or have no satisfactory surface smoothness with tackiness durably remaining in the surface layer.

The polymerization-inhibiting action of oxygen present in an atmosphere will not conspicuously be apparently appreciated if the concentration of the oxygen in the atmosphere is lower than 2 – 3%, while if the concentration of the oxygen in the atmosphere is higher than a few percent the action will be remarkably noticeable and particularly remarkably noticeable when conventional curable compositions are coated like a paint to form thin films which are then cured.

Many studies have heretofore been made in an attempt to eliminate such polymerization-inhibiting action of oxygen. The methods which have been proposed include, for example, a method which comprises covering a conventional curable composition-coated surface with a thin plastic film to prevent the air from contacting the surface during the cure of the coated composition; a method which comprises effecting the cure in the atmosphere of an inert gas such as a low-boiling liquid, monomer vapor, nitrogen gas or carbonic acid gas (see, for example, U.S. Pat. No. 3,586,526); a method which comprises allowing a conventional curable composition to contain wax or a surfactant so that it forms a thin film floating on a layer when the layer is formed by coating the curable composition, and then curing the layer without the contact of the air therewith due to the formation of said thin film (see, for example, U.S. Pat. No. 3,531,317); and a method which comprises introducing to a conventional curable composition a specific functional group that is reactive with oxygen and capable of reacting with oxygen to form a thin cured film on the surface of a layer when the layer is formed by coating the functional group-introduced curable composition, thereby to modify the composition, and then curing said layer without the contact of the air therewith due to the formation of said thin cured film.

An example of a curable composition in which such a specific functional group is used, is an unsaturated polyester modified with an allyl ether group, benzyl ether group or tetrahydrophthalic acid group, the unsaturated polyester being dissolved in a monomer such as styrene and then cured in the presence of catalysts containing a peroxide and metallic salt [see, for example, U.S. Pat. No. 3,511,687 and "Kobunshi (High Molecular Compound)"13, 419 (1964) by Tokuya Yosomiya].

However, said conventional or known methods are still fairly unsatisfactory ones. For example, for the practice of the method which comprises covering with a plastic film and the method which comprises substituting the air by an inert gas, the film and inert gas are needed and a specially designed apparatus for curing is also needed. Thus the industrial practice of these methods will necessarily cost more.

The practice of the method which comprises the incorporation of wax or the like needs a strict condition under which the wax or the like forms a uniform natant layer, requires a time for setting the composition and raises a problem that the layer of the wax or the like must be polished after curing the composition.

The use of the unsaturated polyester modified with the specific functional group eliminates such defects as mentioned above, but it is disadvantageous in that the modified polyester is expensive due to the modification with the specific functional group, and large amounts of a low-boiling monomer such as styrene or a lower alkyl ester of (meth)acrylic acid must be used in the modified polyester-containing composition whereby, when the composition is coated and cured on a substrate, the evaporation of the monomer varies the coated composition in constitution and causes a detonating gas and offensive odor to be evolved. Thus, were the curable composition to be non-volatile and capable of curing in the presence of the air, the procedure of use thereof would greatly be simplified.

Studies were made by the present inventors in an attempt to solve the aforesaid problems and obtain a composition which is curable by other means than the action of ionizing radiation in the presence of a molecular oxygen-containing gas such as air and, as a result of the studies, it has been found by them that oligoacrylates having at least three acryloyl groups and at least one cyclohexene nucleus are non-volatile and a composition composed of the oligoacrylate and a radical polymerization initiator is particularly satisfactory in curability, thereby accomplishing this invention.

The oligoacrylates which may be used in the practice of this invention have a boiling point of at least 200°C, preferably at least 250°C, more preferably at least 300°C at normal atmospheric pressure, and they are represented by the following general formula [I]:

[I]

wherein $n$ is an integer of from 3 to 6 and X is an organic group containing at least one cyclohexene nucleus represented by the following general formula [II]:

(II)

The organic groups include the residue of polyesters, polyethers, polyurethanes and polyamides, as well as of the combinations thereof such as polyetherpolyester and polyesterpolyurethane. The prefix "poly" used in this specification is defined to mean "one" in addition to "more than one".

The curability in the air of the oligoacrylates of the formula [I] wherein $n$ is not more than 2, is influenced by the kind of curing means and catalyst used. Thus, such oligoacrylates may sometimes be unsatisfactorily cured.

The oligoacrylates of the formula [I] wherein $n$ is 7 or more can be synthesized by the selective use of raw materials for synthesis and method therefor. However, the synthesis of the oligoacrylates of the formula [I] wherein $n$ is too large is generally liable to be accompanied with troubles such as gelling caused by cyclizing condensation and polymerization. Such synthesis is thus practically unsuitable.

The oligoacrylates represented by said formula [I] widely vary in structure and molecular weight depending upon the kind and composition of raw materials used for synthesis and the type of method used for synthesis. Since, however, oligoacrylates having an excessively large molecular weight result in the fact that they contain acryloyl groups in a low concentration for their large molecular weight thereby decreasing their curability in the air, the oligoacrylates according to this invention should have an acryloyl group equivalent (the equivalent being intended throughout the specification to mean the quantity resulting from the division of the molecular weight of the oligoacrylate by the number of the acryloyl groups contained therein) of not more than 1000, preferably not more than 600.

The "X" of the formula [I] may have various functional groups such as hydroxyl and carboxyl groups or may have unsaturated linkage-containing, functional groups such as methacryloyl group, allyl group and maleic acid residue.

As the sources of cyclohexene nucleus which is to be introduced to oligoacrylates, there may conveniently be used cyclohexenemonocarboxylic acid, cyclohexenedicarboxylic acid, cyclohexenetricarboxylic acid, 6-methylcyclohexene-4-1,2,3-tricarboxylic acid, Himic acid, (endo-5-norbornene-2,3-dicarboxylic acid) endo acid (7,7-dimethyl-endo-5-norbornene-2,3-dicarboxylic acid), cyclohexenol, cyclohexenediol and the like, as well as the halogen-substituted compounds thereof such as Het acid (1,4,5,6,7,7-hexachloro-endo-5-norbornene-2,3-dicarboxylic acid), mono- and polychlorotetrahydrophthalic acid, mono- and polybromotetrahydrophthalic acid and 1,4,5,6,7,7-hexabromoendo-5-norbornene-2,3-dicarboxylic acid. There may also be used the anhydrides, acid halides, esters, amides and other derivatives of the above-mentioned polybasic acids.

The cyclohexene nucleus-containing oligoacrylates may be synthesized by known processes using as the principal raw materials both acrylic acid or its derivatives such as acrylic acid ester or chloride and the aforesaid cyclohexene nucleus-containing compound and using as the accessory raw materials a polybasic acid or its anhydride, a polyhydric alcohol, a polyisocyanate, a polyepoxide and the like to be described later. In the synthesis of the oligoacrylates, there are utilized the usual esterifying reaction and the reaction with a polyisocyanate which are described in, for example, U.S. Pat. Nos. 3,455,801, 3,455,802, 3,470,079, 3,471,386 and 3,567,494; A. A. Berlin et al. "Polyesteracrylate", Nauka, Moscow (1967); and "Hannobetsu Jitsuyoshokubai (Particular Catalyst For Particular Reaction)" pp. 909 and 932 (1970).

As a matter of course, it is necessary to use at least a member selected from trihydric and higher alcohols, tribasic and higher acids and the derivatives thereof, which compounds are among the principal and accessary raw materials, in order to synthesize oligoacrylates of the general formula [I] wherein n is not less than 3. If all of the principal or accessory raw materials used are dihydric or lower alcohols, or dibasic or lower acids, there will be obtained only oligoacrylates of the formula [I] wherein n is not more than 2.

The accessory or adjuvant raw materials which may be used in the synthesis of the oligoacrylates according to this invention, include: polycarboxylic acids, for example, dicarboxylic acids such as phthalic, isophthalic, terephthalic, hexahydrophthalic, tetrachlorophthalic, tetrabromophthalic, methylhexahydrophthalic, polybutadienedicarboxylic, oxalic, malonic, succinic, glutaric, adipic, sebacic, dodecanedioic, maleic, fumaric, itaconic, trimethyladipic, methyleneglutaric, ethylmalonic, acetylenedicarboxylic, methylmaleic, methylfumaric, thiodiglycolic, thiodivalerianic, sulfonyldiacetic, sulfonyldivalerianic, 2,4-benzophenonedicarboxylic, bisphenol A diacetic, resorcinolacetic, α-methylitaconic, α,α-dimethylitaconic, α-ketoglutaric, methylsuccinic, 2,2- or 2,3-dimethylsuccinic, hexylsuccinic, dodecenylsuccinic, pimelic, suberic, azelaic, 3,3- or 2,2-dimethylglutaric, 3,3- or 2,2-diethylglutaric, 1,1-cyclobutanedicarboxylic, diglycolic, malic, cyclopentanedicarboxylic, dihydrophthalic, cyclohexanedicarboxylic, α-methylglutaric and halogenated tetrahydrophthalic acids, as well as tricarboxylic or higher acids such as trimellitic, aconitic, butanetricarboxylic, butenetricarboxylic, naphthalenepolycarboxylic, bicyclooctenetetracarboxylic, pyromellitic, butanetetracarboxylic and benzenetetracarboxylic acids, and the anhydrides thereof.

The polyhydric alcohols which may be used herein, include diols such as ethylene glycol, propylene glycol, 1,3-butanediol, 1,4-butanediol, 1,6-hexanediol, neopentyl glycol, diethylene glycol, triethylene glycol, tetraethylene glycol, polyethylene glycol, dipropylene glycol, polypropylene glycol, hydrogenated bisphenol A, cyclohexane-1,4-dimethanol, m-xylidene glycol, diethanolamine, dibromoneopentyl glycol, bisphenol dioxyethyl ether, bisphenol dioxypropyl ether, polybutadienediol, hydroxyethyl thioether, 1,5-pentanediol, 2,3-butanediol, 1,4-cyclohexanediol, chloropropylene glycol, octanediol, trimethylene glycol, tetramethylene glycol, 2-ethyl-1,4-butanediol, 2,10-decanediol, 2,3-diethylpropanediol, 3-methylpentanediol, 2,2-diethylbutanediol, 4,5-nonandiol, pentamethylene glycol, hexamethylene glycol, nonamethylene glycol, decamethylene glycol, butene-2-diol-1,4, heptamethylene glycol, diglycol and 2,2'-dihydroxybistrimethylene glycol; and further include triols and higher polyols, such as trimethylolpropane, trimethylolethane, glycerine, 1,2,6-hexanetriol, tris(2-hydroxyethyl)isocyanurate, xylitol, trimethanolamine, triethanolamine, pentaerythritol, diglycerol, erythritol, sorbitol, mannitol, arabitol, dulcitol, glycerine tri(polyethylene glycol)ether and glycerine tri(polypropylene glycol)ether.

As substitutes for the dihydric alcohols, there may also be used, for example, monoepoxides such as ethylene oxide, propylene oxide, styrene oxide, butylglycidyl ether, phenylglycidyl ether, epichlorohydrin, methylepichlorohydrin, butadiene monoxide, (meth)allyglycidyl ether and 3-hydroxypropylene oxide, and polysiloxane type polyhydric alcohols such as polysiloxane-di(3-hydroxy-2,2'-dimethylpropyl)ether and polysiloxane-di(2-hydroxyethyl) ether [the polyhydric alcohols being disclosed in British Pat. No. 1,145,096 and the like]. In addition, polyepoxides such as bisphenol A diglycidyl ether [the polyepoxides being disclosed in the previously mentioned "Practical Catalyst For Particular Reaction, p. 910" and "Kogyo Zairyo (Materials For Industrial Use) 18-5, p. 11 (1970)", and the like] or polyisocyanates such as lysinediisocyanate and tolylenediisocyanate [the polyisocyanates being disclosed in said "Practical Catalyst For Particular Reaction, p. 933", and the like] may be used in place of the aforementioned polyhydric alcohols or polybasic acids. Furthermore, depending on the purpose for which they are used, there may be used saturated and unsaturated monobasic acids such as methacrylic acid, crotonic acid and propionic acid; the anhydrides and halides thereof; saturated and unsaturated monohydric alcohols such as allyl alcohol and butanol; and monoisocyanates such as phenylisocyanate.

The aforementioned principal or accessory raw materials may be used singly or may be used jointly depending upon the purposes, such as modification of the properties of the oligomers or cured ones, for which they are used.

As may be concluded from the aforesaid raw materials and the reference and working examples to be described later, the oligoacrylates which may particularly conveniently be used in the practice of this invention, should structurally be either an ester prepared by interesterifying a mixture comprising acrylic acid and a polyol selected from the following groups [A] and [B] of polyols, or modifications of said ester, and they should contain 3 – 6 acryloyl groups and at least one cyclohexene nucleus in the molecule and have such a molecular weight as corresponds to an "acryloyl group equivalent" of not more than 1000.

Polyols [A]:

These polyols are those which have the skeleton of a polyester composed of a 4,5-unsaturated alicyclic dicarboxylic acid or its mixture with a di- to tetracarboxylic acid and of a tri- to hexahydric alcohol or its mixture with a dihydric alcohol.

Polyols [B]:

These polyols are those which have the skeleton of a polyester composed of a 4,5-unsaturated alicyclic tricarboxylic acid or its mixture with a di- to tetracarboxylic acid and of a di- to hexahydric alcohol.

The curable compositions of this invention which are composed of the cyclohexene nucleus-containing oligoacrylate and a radical polymerization initiator, are cured even in the presence of a molecular oxygen-containing gas by various curing means such as air cure, ultraviolet ray cure, and heat cure by infrared rays, heating furnaces, microwave or induction heating, thereby giving cured products having a smooth surface. The words "air cure" used herein are intended to mean cure which is effected at room temperature in the presence or absence of the air.

The radical polymerization initiators may be selected depending on the type of curing means used, as indicated hereinunder.

In the case where ultraviolet rays are used for curing, there is used a photoinitiator which will produce radicals due to its absorption of the violet rays.

Such photoinitiators are reported, for example, in "Kogyo Kagaku Zasshi (Magazine of Industrial Chemistry) 72, 31 (1969)" by Yasunori Nishijima and Masao Yamamoto. The preferable photoinitiators include benzoin type compounds such as benzoin, benzoin methyl ether, benzoin ethyl ether, benzoin isopropyl ether, benzoin butyl ether, benzoin octyl ether, α-methyl benzoin and α-phenyl benzoin; carbonyl compounds such as benzil, diacetyl, methylanthraquinone, acetophenone and benzophenone; sulphur compounds such as diphenyl sulphide, diphenyl disulphide and dithiocarbamate; naphthalene and anthracene type compounds such as α-chloromethylnaphthalene and anthracene; halogenated hydrocarbons such as dimethyl tetrachlorophthalate and hexachlorobutadiene; metallic salts such as uranyl nitrate, iron chloride and silver chloride; and dyestuffs such as acriflavine and fluorescein.

In the case where curing is effected mainly by means of heat energy given by heating furnaces, infrared rays, microwaves or the like, a heat polymerization initiator is used. Such heat polymerization initiators are described in, for example, the previously mentioned "Practical Catalyst For Particular Reaction, p. 764". Preferable initiators include azo compounds such as azoisobutyronitrile; various organic peroxides belonging to ketone peroxides, hydroperoxides, alkyl peroxides, acylperoxides and peroxy esters; and inorganic peroxides such as ammonium persulphate.

In the case where air curing of the oligoacrylate is effected by allowing it to stand at room temperatures or by using a heat energy source of comparatively low temperature (100°C or lower), the aforesaid heat polymerization initiator is generally used together with a polymerization accelerator. The accelerators which are usually used include metallic salts such as salts composed of a metal, for example, cobalt, iron or manganese and of naphthenic acid, linolic acid, acetylacetone or the like; and reducing amines and other reducing compounds such as dimethyl-para-toluidine and ascorbic acid. Said metallic salts as the polymerization accelerator are used in combination with a heat polymerization initiator such as a hydroperoxide, ketone peroxide or peroxy ester, and said reducing amines as the accelerator are employed in combination with a heat polymerization initiator such as an acylperoxide.

The photoinitiators, heat polymerization initiators or polymerization accelerators may be used in amounts of preferably 0.001 – 10%, more preferably 0.01 – 5%, by weight of the polymerizable ingredients used.

It is desirable that the cyclohexene nucleus-containing oligoacrylates or compositions containing the same should contain suitably small amounts of a stabilizing agent to prevent them from gelling during their storage and consequently increase their storage stability. The stabilizers used herein include phenolic compounds such as hydroquinone, t-butylhydroquinone, catechol and t-butylcatechol; quinone type compounds such as benzoquinone and diphenylbenzoquinone; phenothiazine type compounds; and copper salts. These stabilizers may preferably be used in amounts of 0.0001 – 3% by weight of the composition containing the oligoacrylate.

In order to obtain a cured product having specific desired properties, the cyclohexene nucleus-containing oligoacrylates according to this invention may be incorporated with one or more kinds of polymerizable and non-polymerizable materials, by uniformly dissolving these materials therein or compounding the same therewith to form a non-uniform mixture, in amounts of up to 90%, preferably up to 70% and more preferably up to 50%, by weight of the resulting whole mass excluding the solvent, and the thus-incorporated oligoacrylates may then be cured.

When it is attempted to combine cyclohexene nucleus-containing oligoacrylates with other oligo(meth)acrylates or compounds, such as diallyl phthalate prepolymers, which have polymerizable functional groups but are, per se, not curable in the air, the amounts of the compounds to be combined should be in the range of preferably up to 200 parts, more preferably up to 100 parts by weight, per 100 parts by weight of the cyclohexene nucleus-containing oligoacrylate. The amounts incorporated beyond said range will deteriorate the resulting composition in air curability.

Even if a polymer or pigment which is normally solid at ambient temperature, is incorporated in the oligoacrylate according to this invention in large amounts, it will not have a considerable effect on the curability of the resulting composition; while the incorporation of said polymer or pigment in too large amounts will give a composition which has increased viscosity or is made solid, thereby rendering it inconvenient to handle the composition. Thus, the amount of said polymer or pigment incorporated should preferably be the same as, or less than, that of the oligoacrylate according to this invention to be incorporated therewith.

The incorporation of other various additives in too large amounts is undesirable since it will result in the resulting composition being lowered in air curability and made inconvenient to handle, whereby the resulting cured product is deteriorated in such properties as strength and hardness.

The additives which may be incorporated include oligo(meth)acrylates containing 1 – 6 (meth)acryloyl groups in the molecule as described in, for example, Japanese Patent Gazette 18,965/71, U.S. Pat. Nos. 3,367,992, 3,551,235, 3,551,246, 3,455,801, 3,455,802, 3,470,079, 3,471,386 and 3,567,494, and British Pat. No. 1,241,851; oligomers such as butadiene oligomers; prepolymers such as diallyl phthalate prepolymers; synthetic and natural polymers, copolymers and rubbers, such as polyethylene, polypropylene, polystyrene, polyacrylates or polymethacrylates, polyvinyl chloride, polybutadiene and cellulose; plasticizers such as dioctyl phthalate and soybean oil; oils and fats; tackifiers; pigments and inorganic fillers such as glass, titanium oxide, silica, barite and calcium carbonate; dyestuffs for coloring; and stabilizers and corrosion resisting agents for increasing the weatherproofing and corrosion resisting properties of cured products. Acrylic and methacrylic acids or their lower alkyl esters, styrene, acrylonitrile, other vinylic monomers or solvents, which have a boiling point of not higher than 200°C, may be incorporated provided that they are incorporated in small amounts, usually in amounts of up to 10% by weight; however the incorporation of these compounds in large amounts is not desirable since they will evaporate at the time of curing thereby raising such problems as mentioned above.

The curable compositions of this invention are advantageous in that they may easily be cured in the air, which permits the curing process to be greatly simplified and curing products to be obtained are superior in heat resistance due to their cross-linking structure. Thus they may widely be used as a coating material or surfacing agent for various materials such as metals, plastics, glass, lumber, paper, fibers and rubber and they may also be used not only as a printing ink vehicle, binder, material for plastic composites and molding material, but also in the manufacture of laminates and castings.

In addition, the oligoacrylates according to this invention contain little or no volatile ingredients which will cause various troubles at the time of curing and they may practically be wholly cured.

Now, the processes for the synthesis of the oligo(meth) acrylates used in both the Examples and Comparative examples to be described later are indicated in the reference examples. The reaction product obtained in each of the reference examples was tested by means of gel permeation chromatography for inferring its chemical structure with the result that the product was found to be a mixture of various oligoacrylates respectively having different structures. Thus, the structural formula of the mixture shown in each of the reference examples is the average chemical formula which is deduced from the composition of the raw materials used for the production of the mixture.

At this point, the structures of the oligo(meth)acrylates will be explained. As described later, they are prepared typically by esterification of the polycarboxylic acid and polyhydric alcohol with (meth)acrylic acid.

Whatever synthesizing process may be employed, the product obtained will not be a single compound but a mixture of various compounds. The particulars of the composition of such mixtures have gradually been somewhat elucidated and are now being further elucidated. For example, Japanese Patent Gazette No. 11194/71 has disclosed that an oligomethacrylate prepared from phthalic acid, ethylene glycol and methacrylic acid in the molar ratio of 1 : 2 : 2.2 should theoretically be a compound having the general formula M + E — P$)_n$ E — M wherein the symbols M and E are as defined later, P is the phthalic residue

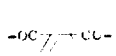

and $n$ is 1, that is, the degree of condensation is 1; and, however, said compound is, for all practical purposes, not a genuine one having the above formula wherein n is 1 but a mixture of compounds having a formula wherein the average of the condensation degrees ($n$'s) is 1.

It is, however, not only troublesome but difficult to analyze such mixture of oligo(meth)acrylates in order to obtain from the mixture individual isolated oligoacrylate constituents for determining their accurate structural formula. Thus, as is seen from, for example, U.S. Pat. Nos. 3,455,801, 3,451,980 and 3,631,154 as well as Japanese Patent Gazettes 13546/72 and 23661/72, when it is attempted to represent the components of an oligo(meth)acrylate mixture — such as the ones to be cured in accordance with the process of this invention — by their chemical name, chemical formula, or structural formula; their average chemical formula is deduced from the formulae of those chemical reactions that are anticipated to take place from the kinds and the molar ratio of starting materials used, and said mixture of oligo(meth)acrylates has generally been represented by said deduced average chemical formula, which shows a macroscopic theoretically inferred compound. Therefore, both (1) the structural formula of a mixture of oligoacrylates according to this invention which contains 3 - 6 acryloyl groups and at least one cyclohexene nucleus in the molecule, with the molecular weight per acryloyl group being not more than 1000, and (2) the chemical formula of mixed oligo(meth)-acrylates, which chemical formula was previously and will later be described in this specification, are based on such theoretically inferred compound as above.

Examples of reaction formulae on which the average chemical formula is based are as follows.

The following formula (1) is for a case where a dicarboxylic acid [represented by R' + COOH)$_2$], a trihydric alcohol [represented by R" + OH)$_3$] and acrylic acid are used as the starting materials, and the formula (2) is for a case where a dicarboxylic acid, a dihydric alcohol [represented by R''' + OH)$_2$] and acrylic acid are used as the starting materials. The symbols R', R" and R''' used in the formulae are dicarboxylic acid residue, triol residue and diol residue, respectively.

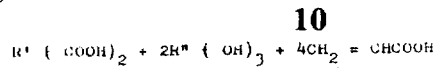

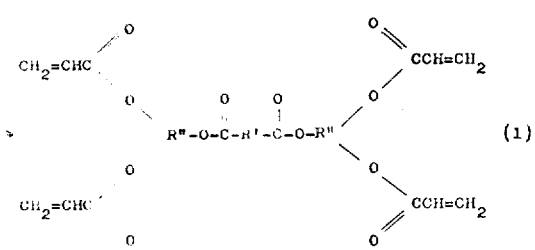

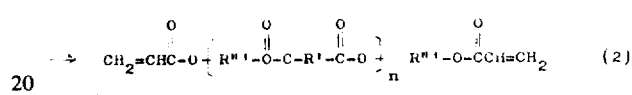

wherein $n$ is an integer of 1 or more.

The symbols used in the structural formulae are intended to mean as follows. For example, the structure of each of the compounds obtained in Reference examples 1 and 7 is illustrated hereinunder. The same applies to the other Reference examples.

Reference example 1

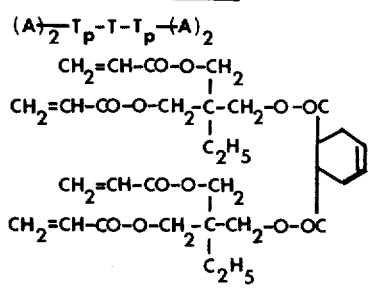

Reference example 7

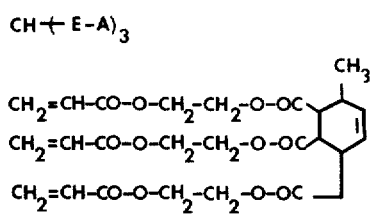

Symbols used in the formulae
[Terminal group]
A   Acryloyl group        $CH_2=CH-CO-$
M   Methacryloyl group    $CH_2=C(CH_3)-CO-$
[Polybasic acid residue]

T   Tetrahydrophthalic acid residue

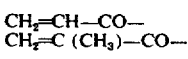

Hi  Himic acid residue

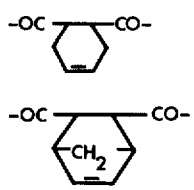

-Continued

| | | |
|---|---|---|
| He | Het acid residue | structure: hexagonal ring with -OC-, -CO-, Cl, CCl₂, Cl, Cl |
| CH | 6-methyl-cyclohexene-4-1,2,3-tricarboxylic acid residue | structure with -OC-, CO=, CH₃, CO- |
| [Polyhydric alcohol residue] | | |
| $T_p$ | Trimethylolpropane residue | —O—CH₂, —O—CH₂, C, CH₂—O—, C₂H₅ |
| G | Glycerine residue | —O—CH₂—CH—CH₂—O— with O |
| $H_T$ | 1,2,6-hexanetriol residue | —O—CH₂—CH(CH₂)₃CH₂—O— with O |
| Pe | Pentaerithritol residue | —O—CH₂, —O—CH₂, C, CH₂—O—, CH₂—O— |
| E | Ethylene glycol residue | —O—CH₂—CH₂—O— |
| D | Diethylene glycol residue | —O(CH₂—CH₂—O)₂ |

REFERENCE EXAMPLE 1

$T + T_p + A)_2]_2$

A reactor provided with an agitator, thermometer and water separator, was charged with 76 g (0.5 mol) of tetrahydrophthalic anhydride, 134 g (1 mol) of trimethylolpropane, 144 g (2 mol) of acrylic acid, 1000 cc of toluene, 98% sulphuric acid in the amount of 2.5% by weight of the total of said ingredients excluding the 98% sulphuric acid, and phenothiazine in the amount of 0.08% by weight of said acrylic acid.

The resulting liquid mixture was agitated at 110°C while removing water produced by the esterifying reaction, as an azeotropic mixture with the toluene from the reaction system.

After removal of the theoretical amount of water produced in 8 hours, the reaction was terminated and the reaction mixture cooled.

The reaction mixture was washed with 600 cc of an aqueous solution containing 3% by weight of ammonia and 20% by weight of ammonium sulphate and then washed with an aqueous solution containing 20% by weight of ammonium sulphate, after which the toluene layer was incorporated with 0.05 g of hydroquinone and then distilled at 50°C under a reduced pressure of 6 mm Hg to cut the toluene, leaving the oligoacrylate as the bottoms.

The oligoacrylate obtained as the bottoms was a yellow-colored viscous liquid [viscosity: 54000 cps (21°C)] and had an acryloyl group equivalent of 155.

REFERENCE EXAMPLE 2

$T + G + A)_2]_2$

The procedure of Reference example 1 was followed except that the trimethylolpropane was substituted by 92 g (1 mol) of glycerine.

The oligoacrylate obtained was a light-brown colored, viscous liquid having an acryloyl group equivalent of 135.

REFERENCE EXAMPLE 3

$T + H_T + A)_2]_2$

The procedure of Reference example 1 was followed except that the trimethylolpropane was substituted by 134 g (1 mol) of 1,2,6-hexanetriol, to obtain an oligoacrylate.

The oligoacrylate so obtained was a yellow-colored, viscous liquid having an acryloyl group equivalent of 154.

REFERENCE EXAMPLE 4

$T + Pe + A)_3]_2$

The procedure of Reference example 1 was followed, but substituting the trimethylolpropane and acrylic acid by 136 g (1 mol) of pentaerythritol and 216 g (3 mol) of acrylic acid, respectively. The oligoacrylate obtained was a yellow-colored, viscous liquid [viscosity: 26250 cps (25°C)] with an acryloyl group equivalent of 122.

REFERENCE EXAMPLE 5

$Hi + G + A)_2]_2$

The procedure of Reference example 1 was followed except that the tetrahydrophthalic acid and trimethylolpropane were substituted by 91 g (0.5 mol) of Himic acid (endo-5-norbornene-2,3-dicarboxylic acid) and 92 g (1 mol) of glycerine, respectively, to obtain an oligoacrylate. The oligoacrylate so obtained was a yellow-colored, viscous liquid having an acryloyl group equivalent of 136.

REFERENCE EXAMPLE 6

$HE + T_p + A)_2]_2$

The procedure of Reference example 1 was followed, but substituting the tetrahydrophthalic anhydride by 194.5 g (0.5 mol) of Het acid (1,4,5,6,7,7-hexachloro-endo-5-norbornene-2,3-dicarboxylic acid) to obtain an oligoacrylate, which was a light-brown colored liquid having an acryloyl group equivalent of 209.

REFERENCE EXAMPLE 7

$CH + E—A)_3$

Synthesis was effected following the procedure of Reference example 1 except that the tetrahydrophthalic anhydride, trimethylolpropane and acrylic acid were substituted by 114 g (0.5 mol) of 6-methyl-cyclohexene- 4-1,2,3-tricarboxylic acid and 174 g (1.5 mol) of β-hydroxyethyl acrylate, to produce an oligoacrylate. The oligoacrylate so produced was a light-yellow colored liquid having an acryloyl group equivalent of 174.

REFERENCE EXAMPLE 8

$G + T—D—A)_3$

To the same reactor as used in Reference example 1 were added 46 g (0.5 mol) of glycerine, 228 g (1.5 mol) of tetrahydrophthalic anhydride and 0.3 g of trimethylbenzylammonium chloride to form a mixture which was then heated to approximately 100°C for 3 hours. The mixture was further incorporated with 159 g (1.5 mol) of diethylene glycol, 108 g (1.5 mol) of acrylic acid, 1000 cc of toluene, 2.5% by weight of sulphuric acid and 0.08% by weight of phenothiazine, and the whole mass was then treated in the same manner as in Reference example 1 to obtain an oligoacrylate. The amounts of the sulphuric acid and phenothiazine were based on the total weight of said glycol and acrylic acid.

The oligoacrylate so obtained was a light-brown colored, viscous liquid [viscosity: 19140 cps (25°C)] having an acryloyl group equivalent of 325.

REFERENCE EXAMPLE 9

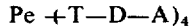

Pe +T—D—A)₄

The procedure of Reference example 1 was followed, but substituting the tetrahydrophthalic anhydride, trimethylolpropane and acrylic acid by 152 g (1 mol) of tetrahydrophthalic anhydride, 34 g (0.25 mol) of pentaerithritol, 106 g (1 mol) of diethylene glycol and 72 g (1 mol) of acrylic acid, thereby obtaining an oligoacrylate which was a light-brown colored, viscous liquid [viscosity: 64000 cps (25°C] having an acryloyl group equivalent of 328.

REFERENCE EXAMPLE 10

D + T-Pe + A)₃]₂

To the same reactor as used in Reference example 1 were added 53 g (0.5 mol) of diethylene glycol, 152 g (1 mol) of tetrahydrophthalic anhydride and 0.2 g of trimethylbenzylammonium chloride, and the resulting mixture was heated to about 100°C for 3 hours. The mixture was then incorporated with 136 g (1 mol) of pentaerythritol, 216 g (3 mol) of acrylic acid, 1500 cc of toluene, as well as 2.5% by weight of sulphuric acid and 0.08% by weight of phenothiazine, and the whole mass was esterified in the same manner as in Reference example 1 thereby synthesizing an oligoacrylate. The above percentages were based on the total weight of said pentaerythritol and acrylic acid.

The oligoacrylate thus obtained was a light-brown colored, viscous liquid [viscosity: 90000 cps (21°C)] having an acryloyl group equivalent of 162.

REFERENCE EXAMPLE 11

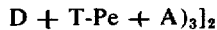

T + T_p +M)₂]₂

The procedure of Reference example 1 was followed except that the acrylic acid was substituted by 172 g (2 mol) of methacrylic acid, to produce an oligoacrylate.

The oligoacrylate so produced was a yellow-colored, viscous liquid [viscosity: 7820 cps (25°C)] having an acryloyl group equivalent of 169.

EXAMPLES 1 – 10 AND COMPARATIVE EXAMPLES 1 –3

Each of the oligo(meth)acrylates obtained in Reference examples 1 –11, trimethylolpropane triacrylate and diethylene glycol diacrylate, was combined with benzoin ethyl ether in the amount of 2% by weight of said acrylic compound used, to form a composition which was thoroughly mixed and then coated to a thickness of 10 – 15 μ on an 0.5 mm thick iron plate. The composition-coated plates were each placed on a conveyor which was moved 13 cm below high pressure mercury lamps (H 2000 TQ, 2 KW, 2 lamps, manufactured by Matsushita Denki Sangyo Co., Ltd.) at such a speed that the coating of the composition was irradiated by the mercury lamps in the presence of the air for the predetermined period of time as indicated in Table 1. The results are shown in the extreme right-hand column of Table 1.

Table 1

| | | Oligo(meth)-acrylate used | | Time of irradiation by ultraviolet rays (sec) | Appearance of coating |
|---|---|---|---|---|---|
| Example | 1 | Reference example | 1 | 15 | Hard, colorless, Transparent and Smooth |
| " | 2 | " | 2 | 15 | " |
| " | 3 | " | 3 | 15 | " |
| " | 4 | " | 4 | 15 | " |
| " | 5 | " | 5 | 15 | " |
| " | 6 | " | 6 | 15 | " |
| " | 7 | " | 7 | 20 | " |
| " | 8 | " | 8 | 15 | " |
| " | 9 | " | 9 | 15 | " |
| " | 10 | " | 10 | 15 | " |
| Comparative example | 1 | Reference example 11 | | 60 | Surface of coating, tacky |
| " | 2 | Trimethylolpropane triacrylate *1 | | 60 | " |
| " | 3 | Diethylene glycol diacrylate *2 | | 60 | " |

*1 Supplied under the trade name of NK ESTER A — TMPT by Shin Nakamura Chemical Co., Ltd.
*2 Supplied under the trade name of NK ESTER A — 2G by the above company.

EXAMPLES 11 – 20 AND COMPARATIVE EXAMPLES 4 –6

Each of the oligo(meth)acrylates obtained in Reference examples 1 – 11, trimethylolpropane triacrylate (same as Comparative example 2) and diethylene glycol diacrylate (same as Comparative example 3), was combined with 2% by weight of benzoyl peroxide to form a composition which was thoroughly agitated and then coated to a thickness of 10 – 15 μ on an 0.5 mm thick iron plate.

The composition-coated plates thus obtained were each placed 20 cm below an infrared ray heater [Paneheater D Type, 2 KW, manufactured by Kokusai Electrical Co., Ltd.] to be irradiated thereby in the presence of the air. They were each raised to about 115°C in temperature in 5 minutes after the start of irradiation. The results are indicated in Table 2.

Table 2

| | | Oligo(meth)acrylate used | | Time of irradiation by infrared rays (sec) | Appearance of coating |
|---|---|---|---|---|---|
| Example | 11 | Reference example | 1 | 5 | Hard, Colorless, Transparent and Smooth |
| " | 12 | " | 2 | 5 | |
| " | 13 | " | 3 | 5 | |
| " | 14 | " | 4 | 5 | |
| " | 15 | " | 5 | 5 | |
| " | 16 | " | 6 | 5 | |
| " | 17 | " | 7 | 5 | |
| " | 18 | " | 8 | 5 | |
| " | 19 | " | 9 | 5 | |
| " | 20 | " | 10 | 5 | |

Table 2—Continued

|  | Oligo(meth)acrylate used | Time of irradiation by infrared rays (sec) | Appearance of coating |
|---|---|---|---|
| Comparative example 4 | Reference example 11 | 10 | Surface of coating, Tacky |
| " 5 | Trimethylolpropane triacrylate | 10 | Surface of coating, Tacky; Cracks |
| " 6 | Diethylene glycol diacrylate | 10 | Surface of coating, Tacky |

EXAMPLES 21 – 30 AND COMPARATIVE EXAMPLES 7 – 9

Each of the oligo(meth)acrylates obtained in Reference examples 1 – 11, trimethylolpropane triacrylate (same as Comparative example 2) and diethylene glycol diacrylate (same as Comparative example 3), was incorporated with 2% by weight of methyl ethyl ketone peroxide and 0.5% by weight of cobalt linolate as the accelerator to form a composition which was thoroughly mixed and then coated to a thickness of 10 – 15 μ on an 0.5 mm thick iron plate. The composition-coated iron plates were then allowed to stand at room temperature in the air thereby to cure them. The results are shown in Table 3.

Table 3

|  | Oligo(meth)acrylate used | Residence time at room temperature (day) | Appearance of coating |
|---|---|---|---|
| Example 21 | Reference example 1 | 1 | Hard, Colorless, Transparent and Smooth |
| " 22 | " | 2 | 1 " |
| " 23 | " | 3 | 2 " |
| " 24 | " | 4 | 1 " |
| " 25 | " | 5 | 2 " |
| " 26 | " | 6 | 1 " |
| " 27 | " | 7 | 3 " |
| " 28 | " | 8 | 2 " |
| " 29 | " | 9 | 2 " |
| " 30 | " | 10 | 2 " |

Table 3-Continued

|  | Oligo(meth)acrylate used | Residence time at room temperature (day) | Appearance of coating |
|---|---|---|---|
| Comparative example 7 | Reference example 11 | 5 | Surface of coating, Tacky |
| " 8 | Trimethylolpropane Triacrylate | 5 | " |
| " 9 | Diethylene glycol diacrylate | 5 | Surface of coating, Tacky; Devitrification |

What is claimed is:

1. A curable composition comprising a radical polymerization initiator and an oligoacrylate containing 4-6 acryloyl groups and at least one cyclohexene nucleus in the molecule and having a boiling point of not lower than 200°C and an acryloyl group equivalent of not more than 1000, the oligoacrylate being a reaction product prepared by interesterifying a mixture of acrylic acid, at least one member selected from the group consisting of tetrahydrophthalic acid and anhydride thereof, and at least one member selected from the group consisting of trimethylolpropane and pentaerythritol.

2. A curable composition according to claim 1, wherein the radical polymerization initiator is a photoinitiator selected from the group consisting of benzoin compounds, carbonyl compounds, sulphur compounds, and naphthalene and anthracene type compounds.

3. A curable composition according to claim 2, wherein the benzoin compounds are benzoin, benzoin methyl ether, benzoin ethyl ether, benzoin isopropyl ether, benzoin butyl ether, benzoin octyl ether, α-methyl benzoin and α-phenyl benzoin; the carbonyl compounds are benzil, diacetyl, methylanthraquinone, acetophenone and benzophenone; the sulphur compounds are diphenyl sulphide, diphenyl disulphide and dithiocarbamate; and the naphthalene and anthracene type compounds are α-chloromethylnaphthalene and anthracene.

4. A curable composition according to claim 1, wherein the radical polymerization initiator is a heat polymerization initiator selected from the group consisting of organic peroxides.

5. A curable composition according to claim 4, wherein the organic peroxides are ketone peroxides, hydroperoxides, alkyl peroxides, acyl peroxides and peroxy esters.

* * * * *